US011249679B2

(12) United States Patent
Shen et al.

(10) Patent No.: US 11,249,679 B2
(45) Date of Patent: Feb. 15, 2022

(54) SELECTING A WRITE OPERATION MODE FROM MULTIPLE WRITE OPERATION MODES

(71) Applicant: Micron Technology, Inc., Boise, ID (US)

(72) Inventors: Zhenlei Shen, Milpitas, CA (US); Fangfang Zhu, San Jose, CA (US); Tingjun Xie, Milpitas, CA (US); Jiangli Zhu, San Jose, CA (US)

(73) Assignee: MICRON TECHNOLOGY, INC., Boise, ID (US)

( * ) Notice: Subject to any disclaimer, the term of this patent is extended or adjusted under 35 U.S.C. 154(b) by 0 days.

(21) Appl. No.: 16/527,815

(22) Filed: Jul. 31, 2019

(65) Prior Publication Data

US 2021/0034291 A1    Feb. 4, 2021

(51) Int. Cl.
*G06F 3/06* (2006.01)

(52) U.S. Cl.
CPC .......... *G06F 3/0659* (2013.01); *G06F 3/0604* (2013.01); *G06F 3/0634* (2013.01); *G06F 3/0673* (2013.01)

(58) Field of Classification Search
CPC .... G06F 3/0659; G06F 3/0604; G06F 3/0634; G06F 3/0673
See application file for complete search history.

(56) References Cited

U.S. PATENT DOCUMENTS

| | | | |
|---|---|---|---|
| 9,859,013 B2* | 1/2018 | Lasser | G11C 13/0002 |
| 2008/0028099 A1* | 1/2008 | M.P. | H04L 12/66 709/238 |
| 2012/0307643 A1* | 12/2012 | Naz | H04L 41/142 370/241 |
| 2014/0269043 A1* | 9/2014 | Chu | G11C 13/0004 365/163 |
| 2015/0180671 A1* | 6/2015 | Yamashita | H04L 9/3271 713/168 |
| 2015/0325290 A1 | 11/2015 | Lasser | |
| 2016/0070643 A1* | 3/2016 | Shen | G11C 16/349 711/103 |
| 2016/0247567 A1 | 8/2016 | Ikegami et al. | |
| 2016/0267974 A1 | 9/2016 | Miyazaki et al. | |
| 2016/0378623 A1 | 12/2016 | Kumar et al. | |
| 2019/0129642 A1 | 5/2019 | Haque et al. | |
| 2019/0147941 A1* | 5/2019 | Qin | G11C 11/419 711/102 |
| 2020/0066342 A1* | 2/2020 | Ha | G11C 7/04 |

OTHER PUBLICATIONS

International Search Report and Written Opinion dated Nov. 6, 2020, on Application No. PCT/2020/044325.

* cited by examiner

*Primary Examiner* — Tuan V Thai
(74) *Attorney, Agent, or Firm* — Lowenstein Sandler LLP

(57) ABSTRACT

A request to write data at the memory component is received. Responsive to receiving the request to write the data at the memory component, a random value is determined. A first write operation mode from multiple write operations modes is selected based on the random value. A write operation to write the data at the memory component is performed in accordance with the first write operation mode.

18 Claims, 7 Drawing Sheets

SELECTING A WRITE OPERATION MODE FROM MULTIPLE WRITE OPERATION MODES

TECHNICAL FIELD

Embodiments of the disclosure relate generally to memory sub-systems, and more specifically, relate to selecting a write operation mode from multiple write operation modes.

BACKGROUND

A memory sub-system can be a storage system, such as a solid-state drive (SSD), or a hard disk drive (HDD). A memory sub-system can be a memory module, such as a dual in-line memory module (DIMM), a small outline DIMM (SO-DIMM), or a non-volatile dual in-line memory module (NVDIMM). A memory sub-system can include one or more memory components that store data. The memory components can be, for example, non-volatile memory components and volatile memory components. In general, a host system can utilize a memory sub-system to store data at the memory components and to retrieve data from the memory components.

BRIEF DESCRIPTION OF THE DRAWINGS

The disclosure will be understood more fully from the detailed description given below and from the accompanying drawings of various embodiments of the disclosure.

DETAILED DESCRIPTION

Figure 1:
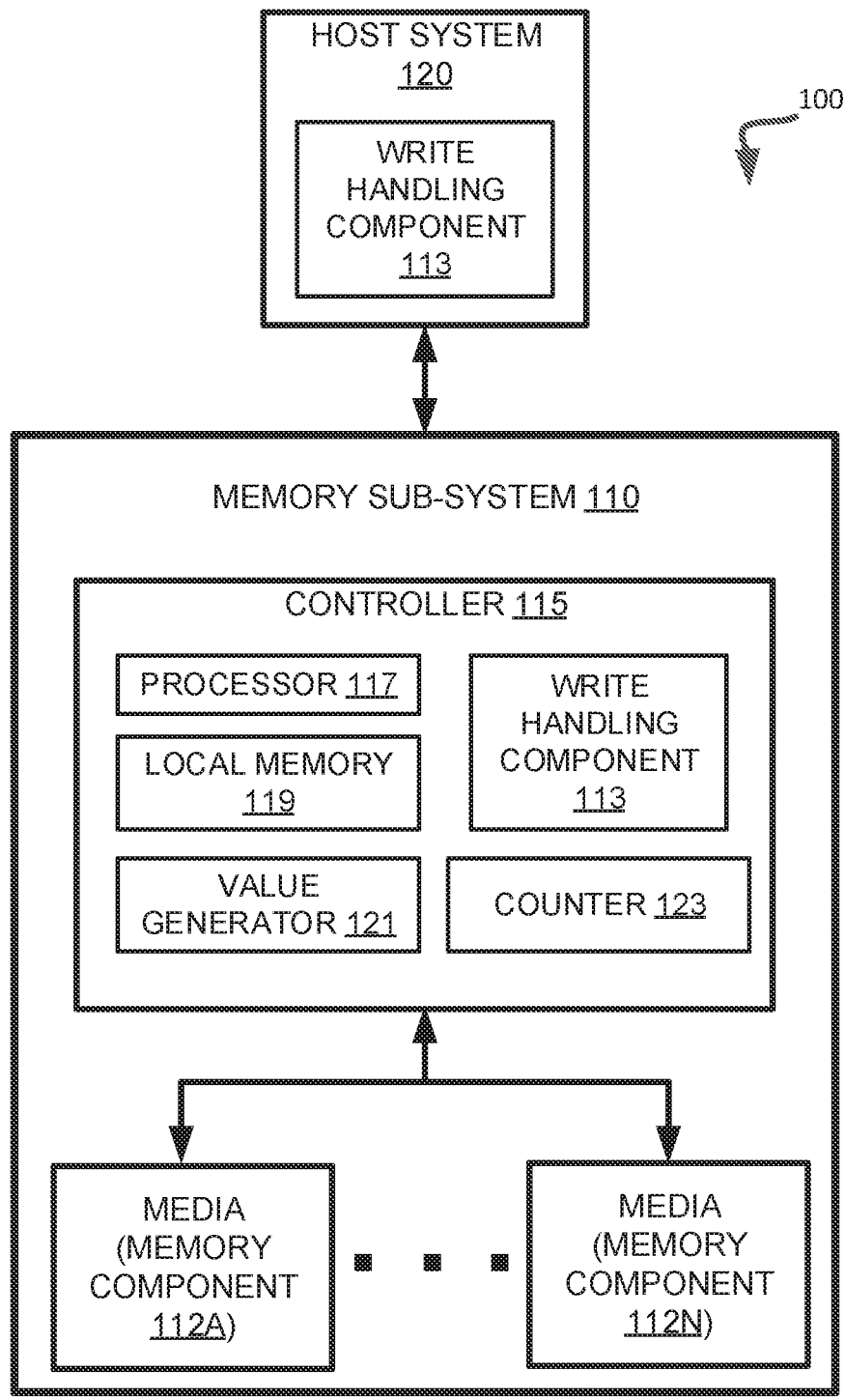
FIG. 1 illustrates an example computing environment that includes a memory sub-system in accordance with some embodiments of the disclosure.

Aspects of the present disclosure are directed to selecting a write operation mode from multiple write operation modes. A memory sub-system is also hereinafter referred to as a "memory device." An example of a memory sub-system is a storage device that is coupled to a central processing unit (CPU) via a peripheral interconnect (e.g., an input/output bus, a storage area network). Examples of storage devices include a solid-state drive (SSD), a flash drive, a universal serial bus (USB) flash drive, and a hard disk drive (HDD). Another example of a memory sub-system is a memory module that is coupled to the CPU via a memory bus. Examples of memory modules include a dual in-line memory module (DIMM), a small outline DIMM (SO-DIMM), a non-volatile dual in-line memory module (NVDIMM), etc. In some embodiments, the memory sub-system can be a hybrid memory/storage sub-system. In general, a host system can utilize a memory sub-system that includes one or more memory components. The host system can provide data to be stored at the memory sub-system and can request data to be retrieved from the memory sub-system.

A write operation can write data at a memory component. Some memory components can have multiple write operation modes where each write operation mode is associated with a write operation that writes data at the memory component in a different manner. Each of the write operation modes can have different characteristics and different trade-offs. Under certain conditions it can be advantageous to select one write operation mode over another write operation mode. As an example, different types of write operation modes can be performed with crosspoint array memory. Such write operation modes can include a normal write operation mode, a force write operation mode, and a toggle force write operation mode.

For example, a normal write operation mode can include a normal write operation to write data at the memory component. The normal write operation has high throughput, consumes relatively low power, and contributes to relatively low wear to the memory component. In some instances, it can be advantageous to perform normal writes operations with a higher frequency than other write operations associated with other write operation modes.

In another example, a force write operation mode can include a force write operation to write data at the memory component. As compared to the normal write operation, the force write operation has slower throughput, higher power consumption, and contributes higher wear to the memory component. A force write operation can be used to clear certain memory disturb effects. In some instances, it can be advantageous to perform force write operations, but at lower frequency than normal write operations.

In still another example, a toggle force write mode can include a toggle force write operation to write data at the memory component. As compared to the force write operation, the toggle force write operation has slower throughput, higher power consumption, and contributes higher wear to the memory component. The toggle force write operation can be used to reset memory states (e.g., from "0" to "1" and vice versa). In some instances, it can be advantageous to perform toggle force write operations, but at a lower frequency than normal write operations and the force write operations.

During the life-cycle of a memory component, it can be advantageous to perform the different write operations at respective frequencies. For instance, a normal write operation can be performed for a majority of write operations. After X number of write operations, disturb effects can negatively affect the error rate of the memory component. It can be advantageous to perform a force write operation after X number of write operations. After Y number of write operations, the unchanged memory states of some memory cells can negatively affect the error rate of the memory component. It can be advantageous to perform a toggle force write operation after Y number of write operations.

In some conventional memory sub-systems, a discrete counter can be used for each data unit (also referred to as "write unit"). A data unit can refer to the smallest unit of data of the memory component that is written to. The counter keeps track of the number of write operations performed at the particular data unit. If the counter reaches a threshold number, a first write operation (e.g., force write) can be performed and the counter is reset. If the counter is not at the threshold number, a second write operation (e.g., normal write operation) can be performed.

Implementing a counter for each data unit contributes to significant resource overhead and contributes to latency. For example, a counter is made available for each data unit that is written and the counter value is recorded for each counter, which contributes to storage overhead. At each write operation, the counter value is read, which contributes to latency.

In some conventional memory sub-systems, a separate counter can be used for each data block. A data block can include multiple data units (e.g., group of data units). The counter keeps track of the number of write operations performed at the data block. If the counter reaches a threshold number, a write operation (e.g., force write) can be performed and the counter is reset. If the counter is not at the threshold number, a second write operation (e.g., normal write operation) can be performed. Using a counter at the data block level, can cause particular data units to be subject to a disproportionate amount of the force writes over time (e.g., "hot spots"), which can lead to uneven wear at the particular data units. For example, if the frequency of a force write is set at every $100^{th}$ write operation, the force write can be performed on the same data units each time the force write is executed, which contributes to excessive wear at the particular data units.

Aspects of the disclosure address the above challenges by receiving a request to write data at the memory component. Responsive to receiving the request to write data at the memory component, a random value can be determined. A particular write operation mode can be selected from multiple write operation modes based on the random value. A write operation to write the data at the memory component can be performed in accordance with the selected write operation mode.

In some embodiments, the random value is generated to be within a range of values. The random value is compared to a comparison value. Responsive to determining that the random value equals the comparison value, a less frequent memory operation can be performed. Responsive to determining that the random value does not equal the comparison value a more frequent memory operation can be performed. In some embodiments, the frequency of performing a particular write operation can be achieved without implementing a counter and using a period, T, in the determination of a range of values within which the random value is selected. The range of values can be (0, T).

In some embodiments, selecting a particular period, T, for the range of values allows for a particular write mode operation to be selected, and performed, at or near a particular frequency. For example, if T is 100, a random value generator has a 1/100 probability of selecting any particular value within the range of values (0,100). Although there is not a guarantee that every $100^{th}$ value produced by the random value generator will be a particular value, the random value generator will generate any particular number roughly 1 out of every 100 numbers generated on average. The frequency that a particular number will be selected can be roughly the frequency, 1/T (e.g., 1/100). Similarly, the frequency that the random number will equal the comparison value is roughly the frequency 1/T. A particular write operation mode can be performed at roughly the frequency 1/T.

In some embodiments, the generation of "hot spots" can be reduced by using a counter at the data block level in conjunction with a random value. In some embodiments, a request to write data at the memory component is received. Responsive to receiving the write request, a counter value is determined. A write operation mode is selected from multiple write operation modes based on a comparison of the counter value to a comparison value that is within a range of values. The write operation to write data to the memory component can be performed in accordance with the selected write operation mode.

In some embodiments, the counter value is compared to a random value (e.g., comparison value) that is generated to be within a range of values. Similar to the above embodiment, the range of values is defined by the particular period, T, such that the range of values is (0, T). The counter value is compared to the random value. Responsive to determining that the counter value does not equal the random value, a more frequent write operation mode is selected and the counter is incremented. Responsive to determining that the counter value does equal the random value, the less frequent write operation mode is selected and the associated write operation performed. The counter can be reset and a new random value that is within the range of value is selected to be the new comparison value.

Being able to select a write operation mode from multiple write operation modes without using a counter at the data unit level can reduce wear at some data units ("hot spots"), reduce storage resource overhead, and reduce latency of a memory sub-system by using a random value in the selection of a particular write operation mode from multiple write operation modes. For example, a counter can be removed from the selection of a write operation mode or can be used at a data block level, rather than a data unit level, which reduces the number of reads of counter values performed for each write operation, reduces the amount of data storage used to store counter values, and reduces uneven wear at particular data units.

FIG. 1 illustrates an example computing environment 100 that includes a memory sub-system 110 in accordance with some embodiments of the disclosure. The memory sub-system 110 can include media, such as memory components 112A to 112N. The memory components 112A to 112N can be volatile memory components, non-volatile memory components, or a combination of such. In some embodiments, the memory sub-system is a storage system. An example of a storage system is a SSD. In some embodiments, the memory sub-system 110 is a hybrid memory/storage sub-system. In general, the computing environment 100 can include a host system 120 that uses the memory sub-system 110. For example, the host system 120 can write data to the memory sub-system 110 and read data from the memory sub-system 110.

The host system 120 can be a computing device such as a desktop computer, laptop computer, network server, mobile device, or such computing device that includes a memory and a processing device. The host system 120 can include or be coupled to the memory sub-system 110 so that the host system 120 can read data from or write data to the memory sub-system 110. The host system 120 can be coupled to the memory sub-system 110 via a physical host interface. As used herein, "coupled to" generally refers to a connection between components, which can be an indirect communicative connection or direct communicative connection (e.g., without intervening components), whether wired or wireless, including connections such as electrical, optical, magnetic, etc. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), etc. The physical host interface can be used to transmit data between the host system 120 and the memory sub-system 110. The host system 120 can further utilize an NVM Express (NVMe) interface to access the memory components 112A to 112N when the memory sub-system 110 is coupled with the host system 120 by the PCIe interface. The physical host interface can provide an interface for passing control, address, data, and other signals between the memory sub-system 110 and the host system 120.

The memory components 112A to 112N can include any combination of the different types of non-volatile memory components and/or volatile memory components. An example of non-volatile memory components includes a negative- and (NAND) type flash memory. Each of the memory components 112A to 112N can include one or more arrays of memory cells such as single level cells (SLCs) or multi-level cells (MLCs) (e.g., triple level cells (TLCs) or quad-level cells (QLCs)). In some embodiments, a particular memory component can include both an SLC portion and a MLC portion of memory cells. Each of the memory cells can store one or more bits of data (e.g., data blocks) used by the host system 120. Although non-volatile memory components such as NAND type flash memory are described, the memory components 112A to 112N can be based on any other type of memory such as a volatile memory. In some embodiments, the memory components 112A to 112N can be, but are not limited to, random access memory (RAM), read-only memory (ROM), dynamic random access memory (DRAM), synchronous dynamic random access memory (SDRAM), phase change memory (PCM), magneto random access memory (MRAM), negative- or (NOR) flash memory, electrically erasable programmable read-only memory (EEPROM), and a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. For example, a bit of '0' or '1' can be determined based on a resistance value of a particular memory cell of the cross point array memory. Furthermore, the memory cells of the memory components 112A to 112N can be grouped as a group of memory cells, wordlines, wordline groups (e.g., multiple wordlines in a group), or data blocks that can refer to a unit of the memory component used to store data.

The memory system controller 115 (hereinafter referred to as "controller") can communicate with the memory components 112A to 112N to perform operations such as reading data, writing data, or erasing data at the memory components 112A to 112N and other such operations. The controller 115 can include hardware such as one or more integrated circuits and/or discrete components, a buffer memory, or a combination thereof. The controller 115 can be a microcontroller, special purpose logic circuitry (e.g., a field programmable gate array (FPGA), an application specific integrated circuit (ASIC), etc.), or other suitable processor. The controller 115 can include a processor (e.g., processing device) 117 configured to execute instructions stored in local memory 119. In the illustrated example, the local memory 119 of the controller 115 includes an embedded memory configured to store instructions for performing various processes, operations, logic flows, and routines that control operation of the memory sub-system 110, including handling communications between the memory sub-system 110 and the host system 120. In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the controller 115, in another embodiment of the disclosure, a memory sub-system 110 cannot include a controller 115, and can instead rely upon external control (e.g., provided by an external host, or by a processor or controller separate from the memory sub-system).

In general, the controller 115 can receive commands or operations from the host system 120 and can convert the commands or operations into instructions or appropriate commands to achieve the desired access to the memory components 112A to 112N. The controller 115 can be responsible for other operations such as wear leveling operations, garbage collection operations, error detection and error-correcting code (ECC) operations, encryption operations, caching operations, and address translations between a logical block address and a physical block address that are associated with the memory components 112A to 112N. The controller 115 can further include host interface circuitry to communicate with the host system 120 via the physical host interface. The host interface circuitry can convert the commands received from the host system into command instructions to access the memory components 112A to 112N as well as convert responses associated with the memory components 112A to 112N into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the controller 115 and decode the address to access the memory components 112A to 112N.

In embodiments, the memory sub-system 110 includes a write handling component 113 that performs operations as described herein. In some embodiments, any component of the memory sub-system 110 can include the write handling component 113. For example, the write handling component 113 can be part of host system 120, controller 115, memory component(s) 112A-112N, or an operating system (OS) (e.g., OS of host system 120). In another example, the controller 115 can include a processor 117 (processing device) configured to execute instructions stored in local memory 119 for performing the operations described herein. Write handling component 113 can select a write operation mode from multiple write operation modes and perform a write operation in accordance with the selected write operation mode.

In some embodiments, the memory sub-system 110 can include one or more value generators 121 (also referred to as "number generator" or "random number generator" herein). In some embodiments, the value generator 121 can generate one or more values, such as numbers or symbols that cannot reasonably be predicted by better than by random chance. A value generator 121 can generate any one number from a range of possible values with equal probability. It can be noted that in some embodiments, the value generator 121 can be a random value generator or pseudo-random value generator. A pseudo-random value generator can generate one or more numbers whose properties approximate the properties of random numbers. It can be noted that random value as described herein can refer to a random value or a pseudo-random value, unless otherwise described. In some embodiments, the value generator 121 can be implemented in hardware (e.g., value generator circuit) at the controller 115 of the memory sub-system 110.

In some embodiments, the memory sub-system 110 can include one or more counters 123. A counter 123 can store a value and increment a value any number of times. For example, a counter 123 can be incremented from 0 to N, and store each current value. In some embodiments, a counter can be associated with a particular data block. For example, a counter 123 can be used to count a number of write operations performed to data units at a data block. In some embodiments, a counter 123 can be a hardware counter, implemented in firmware, or a combination thereof. In some embodiments, the counter 123 can be implemented at the controller 115 or at respective memory components 112A-112N.

In some embodiments, a write operation mode can be selected from multiple write operation modes (also referred to as "write operation type(s)" or "write mode(s)" herein). Some memory components 112A-112N can be written to using multiple write modes. Each of the write operation modes can write to a memory component 112A-112N in a different manner and have different trade-offs. For instance, a non-volatile cross point array memory component can have multiple write operation modes, where each of the of the write operation modes is associated with a write operation that writes to the non-volatile cross point array memory component in a different manner and has different trade-offs.

In some embodiments, the different write operation modes can include one or more of a normal write operation mode (also referred to as a "pre-scan operation mode"), a force write operation mode, and a toggle force write operation mode. It can be noted that the different write operation mode and number of different write operation modes are provided for illustration rather than limitation. Aspects of the present disclosure can be used to select from any multiple write operation modes, and in particular if the multiple write operation modes are to be performed with different frequencies.

In embodiments, a normal write operation (e.g., also referred to as "normal write," "pre-scan write," or "pre-scan write operation" herein) associated with normal write operation mode can write data at a memory component 112A-112N based on a comparison between data units of the data from the volatile memory (e.g., storing the data before the data is written to non-volatile memory) and data units previously stored at the memory component 112A-112N. For example, such data units of memory component 112A-112N can store values that were previously written to the data units when prior data was written to the memory component 112A-112N. The values that were previously written to the data units for the prior data can still be present at the memory component 112A-112N (as an erase operation is not performed for the non-volatile cross point array memory component, for example). In some embodiments, such data units can store the same value (e.g., zero), for example. The normal write operation can include a pre-read operation. The pre-read operation can first identify locations (or data units) in the memory component 112A-112N to be written and can read data that is currently stored at these locations of the memory component 112A-112N. Each data unit of the data to be stored (e.g., data from the volatile memory component) has a corresponding data unit in the memory component 112A-112N. The pre-scan write operation can also include a comparison operation followed by the pre-read operation. For example, if a particular data unit at the memory component 112A-112N currently stores data that matches a corresponding data unit of the data from the volatile memory component, then the processing device can determine not to write the data corresponding to that data unit of the data from the volatile memory component to the data unit at the memory component 112A-112N as the data currently stored at the memory component 112A-112N matches the particular data unit of the volatile memory component. Otherwise, if the particular data unit at the memory component 112A-112N currently stores data that does not match the corresponding data unit of the data that is from the volatile memory component, then a write operation can be performed at the particular data unit of the memory component 112A-112N. For example, a voltage signal can be applied to the particular data unit of the component 112A-112N to change a value of the data stored at the particular data unit. Therefore, in the normal write operation, the processing device writes data to data units of the memory component 112A-112N for the data units that include a data value that is different from a data value of a corresponding data unit from the volatile memory component. In a normal write operation, a portion of the memory cells of a data unit (approximately half of the memory cells of a data unit on average) are re-written and the remaining portion of the memory cells of the data unit keep their previous values. In embodiments, a normal write operation can be the most frequently performed write operation of the multiple write operation modes over the life-cycle of the memory component. The normal write operation mode has one or more of higher throughput, lower wear of the memory cells, and lower power consumption as compared to the other write operation modes.

In embodiments, a force write operation (also referred to as a "force write" herein) associated with the force write operation mode does not perform the pre-read operation or comparison operation. Instead, the force write operation can apply a voltage to every data unit of the memory component 112A-112N that is to store data from the volatile memory component. For example, the force write operation can apply a voltage to a data unit to set a value of "0" and can apply another voltage to another data unit to set a value of "1." Thus, the force write operation can write the entire data of the volatile memory component to the memory component 112A-112N. In some embodiments, the normal write operation can be performed in less time and can take less power. On the other hand, the force write operation can take more time and more power. However, the force write operation can be considered to result in more reliable data storage, as each data unit is being written to store data regardless of stored data, the respective data unit becomes less prone to an error (e.g., an error caused by a drift in voltage threshold for storing data over time). Therefore, the processing device can determine to use the force write operation for better reliability of data when there is sufficient backup power or time to complete the save operation. In some embodiments, the force write operation mode can be used to periodically clear memory disturb effects. The force write operation mode has one or more of lower throughput, higher wear of the memory cells, and higher power consumption as compared to the normal write operation. In embodiments, a force write operation can be less frequently performed than a normal write operation, and be more frequently performed than the toggle force write operation over the life-cycle of the memory component. For example, the force write operation can be performed once for every 100 write operations.

In embodiments, a toggle force write operation (also referred to as a "toggle write" or "toggle write operation" herein) associated with a toggle force write operation mode does not perform the pre-read operation or comparison operation. The toggle force write operation can be referred to as a two-pass force write. A first pass write can be an inverted write where the data is written to a data unit as inverted data (e.g., if the data bit is "0," it is written as "1," and vice versa). A second pass write can be a non-inverted write where the data is written to the data unit as non-inverted data (e.g., if the data bit is "0," it is written as "0," and vice versa). The toggle force write operation can cause each memory cell of a data unit to be programmed as a "0" and "1." The toggle force write can be periodically used to help reset the memory states of the memory cells. The toggle force write operation mode has one or more of lower throughput, higher wear of the memory cells, and higher power consumption as compared to the normal write operation mode and force write operation mode. In embodiments, a toggle force write operation can be less frequently performed than a normal write operation and force write operation over the life-cycle of the memory component. For example, the toggle force write operation can be performed once for every 1000 write operations.

FIG. 2-6 are flow diagrams of various example methods describing aspects of the disclosure. The one or more of methods can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, one or more of the methods are performed by the write handling component 113 of FIG. 1. In some embodiments, write handling component 113 (e.g., firmware, hardware, or a combination thereof) executed at controller 115 of memory sub-system 110 performs some or all of the operations described with respect to one or more of the methods. In some embodiments, for one or more of the methods write handling component 113 is executed by any one or more components of FIG. 1. With respect to the methods illustrated in FIG. 2-6, although shown in a particular order, unless otherwise specified, the order of the operations can be modified. Thus, the illustrated embodiments should be understood only as examples, and the illustrated operations can be performed in a different order, and some operations can be performed in parallel. Additionally, one or more operations can be omitted in various embodiments. Thus, not all operations are required in every embodiment. Other operations flows are possible. In some embodiments, the same, different, additional, or fewer operations can be used.

Figure 2:
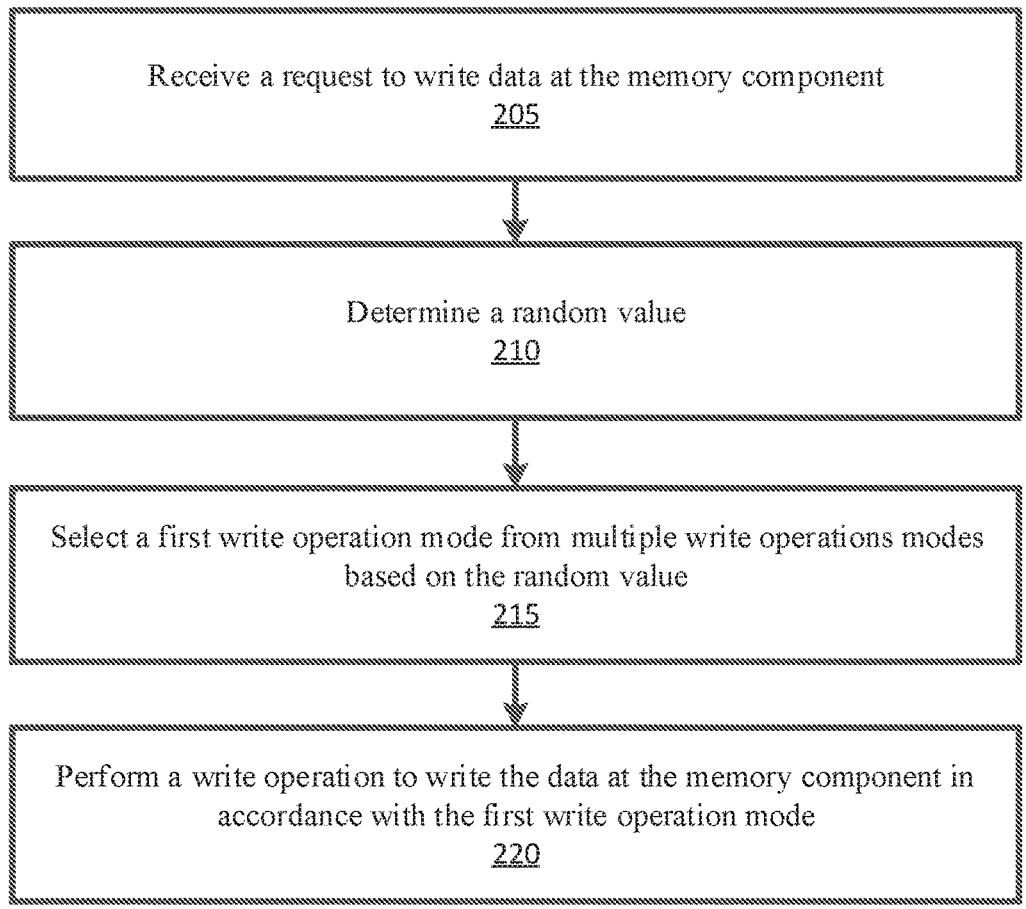
FIG. 2 is a flow diagram of an example method of selecting a write operation mode from multiple write operation modes using a random value, in accordance with some embodiments of the disclosure.

FIG. 2 is a flow diagram of an example method 200 of selecting a write operation mode from multiple write operation modes using a random value, in accordance with some embodiments of the disclosure.

At operation 205, processing logic receives a request to write data at the memory component. For example, the host system can submit a write request to memory sub-system to write data to one or more memory components of memory sub-system.

At operation 210, processing logic determines a random value. In some embodiments, processing logic can determine a random value, responsive to receiving the request to write the data at the memory component.

In some embodiments, to determine the random value, processing logic can cause a generation of the random value that is within a first range of values. The first range of values correspond to a frequency at which the first write operation mode is to be performed. In some embodiments, processing logic can request a value generator to generate or provide one or more random values. The generation of random values is further described with respect to FIGS. 1 and 4-6.

In some embodiments, processing logic can determine the range of values within which the random value is to be generated. In some embodiments, processing logic can determine whether a state of the memory component satisfies a memory state condition. Responsive to determining that the state of the memory component satisfies the memory state condition, processing logic can select the first range of values from multiple ranges of values. Selecting a range of values in which the random value is to be generated is further described with respect to FIG. 4.

At operation 215, processing logic selects a first write operation mode from multiple write operations modes based on the random value. In some embodiments, the first write operation mode is a force write operation mode.

In some embodiments, processing logic can determine whether the random value that is generated to be within a first range of values satisfies a first threshold associated with the first range of values. In some embodiments, to select the first write operation mode (e.g., force write operation mode) from multiple write operations modes is responsive to determining that the random value satisfies the first threshold.

In some embodiments, to determine whether the random value that is generated to be within the first range of values satisfies the first threshold associated with the first range of values, processing logic can compare the random value that is generated to be within the first range of values to a comparison value within the first range of values. Responsive to determining that the random value equals the comparison value in view of the comparison, processing logic can determine that the random value satisfies the first threshold. Responsive to determining that the random value does not equal the comparison value in view of the comparison, processing logic can determine that the random value does not satisfy the first threshold.

At operation 220, processing logic performs a write operation to write the data at the memory component in accordance with the first write operation mode.

In the embodiments, responsive to determining that the random value does not satisfy the first threshold associated with the first range of values, processing logic can select a second write operation mode from multiple write operation modes. Processing logic can perform a write operation to write the data at the memory component in accordance with the second write operation mode. In some embodiments, the second write operation mode is normal write operation mode.

To determine whether the random value that is generated to be within the first range of values satisfies the first threshold associated with the first range of values, processing logic can compare the random value that is generated to be within the first range of values to a comparison value within the first range of values. Responsive to determining that the random value does not equal the comparison value in view of the comparison, processing logic can determine that the random value does not satisfy the first threshold.

In some embodiments, the multiple write operation modes include the first write operation mode and a second write operation mode. The write operation associated with the first write operation mode writes an entire data unit of the memory component. A write operation associated with the second write operation mode writes to a portion of a data unit of the memory component. Selecting the first write operation mode or the second write operation mode is further described with respect to FIG. 4.

The processing logic can determine a second random value that is generated to be within a second range of values. The random value (above) is a first random value. Processing logic can determine whether the second random value that is generated to be within the second range of values satisfies a second threshold associated with a second range of values. Responsive to determining that the second random value satisfies the second threshold associated with the second range of values, processing logic can select a third write operation mode from the plurality of write operation modes. Processing logic can perform a write operation to write the data at the memory component in accordance with the third write operation mode. In some embodiments, the third write operation can be the toggle force write operation.

In some embodiments, the first range of values correspond to a first frequency at which the first write operation mode is to be performed. The second range of values correspond to a second frequency at which the third write operation mode is to be performed. In some embodiments, the first frequency is less than the second frequency.

In some embodiments, responsive to determining that the second random value does not satisfy the second threshold associated with the second range of values, processing logic can determine whether the first random value satisfies a first threshold associated with the first range of values. Responsive to determining that the first random value does not satisfy the first threshold associated with the first range of values, processing logic can select the first write operation mode from the plurality of write operations modes based on the random value. Selecting from three or more write operation modes is further described with respect to FIG. 5.

Figure 3:
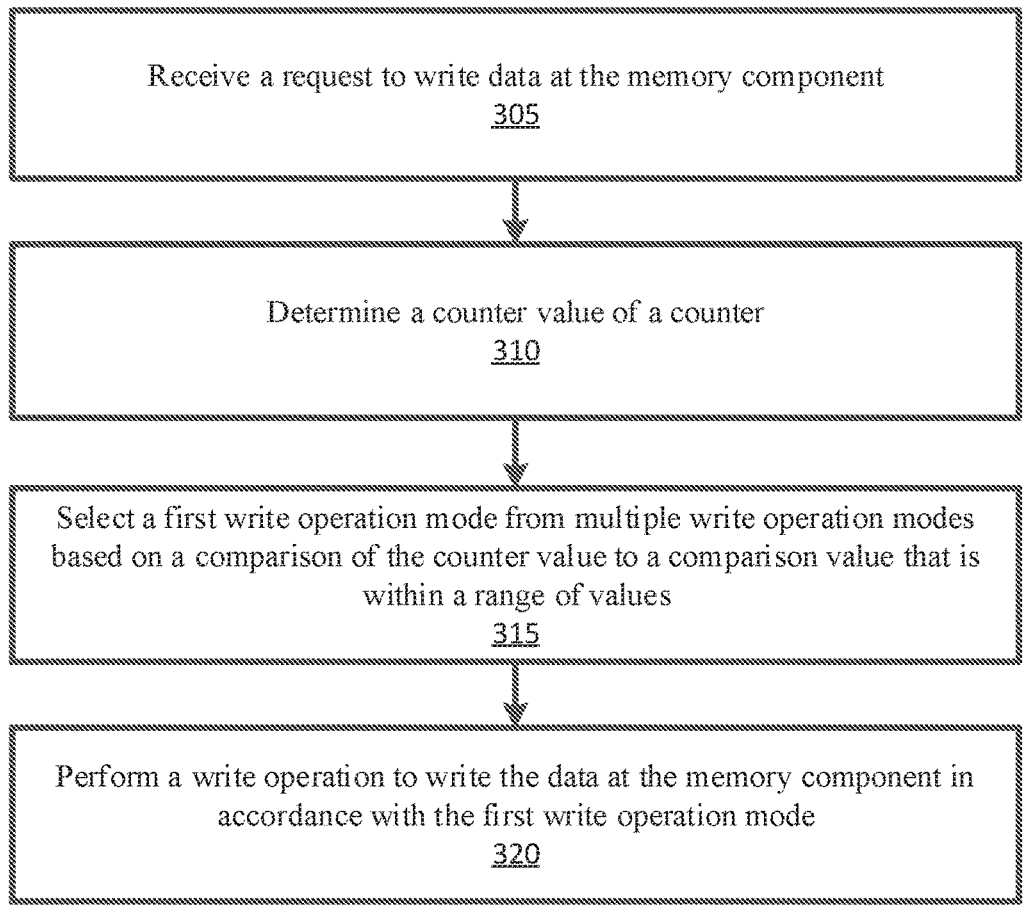
FIG. 3 is a flow diagram of an example method of selecting a write operation mode from multiple write operation modes using a counter, in accordance with some embodiments of the disclosure.

FIG. 3 is a flow diagram of an example method 300 of selecting a write operation mode from multiple write operation modes using a counter, in accordance with some embodiments of the disclosure.

At operation 305, processing logic receives a request to write data at the memory component. For example, the host system can submit a write request to memory sub-system to write data to one or more memory components of memory sub-system.

At operation 310, processing logic determines a counter value of a counter. In some embodiments, processing logic determines a counter value of a counter responsive to receiving the request to write the data at the memory component.

At operation 315, processing logic selects a first write operation mode from multiple write operation modes based on a comparison of the counter value to a comparison value that is within a range of values. In some embodiments, the first write operation mode is the force write operation mode.

In some embodiments, to select a first write operation mode from multiple write operation modes, processing logic can compare the counter value to the comparison value. Processing logic can determine that the counter value is equal to the comparison value based on the comparison. In embodiments, to select the first write operation mode from multiple write operation modes is responsive to determining that the counter value equals the comparison value. In some embodiments, the comparison value is a random value generated to be within the range of values. In embodiments, to select the second write operation mode from multiple write operation modes is responsive to determining that the counter value does not equal the comparison value.

At operation 320, processing logic performs a write operation to write the data at the memory component in accordance with the first write operation mode.

In some embodiments, responsive to performing the write operation to write the data at the memory component in accordance with the first write operation mode, processing logic can generate a random value that is within the range of values. The random value can be used as the comparison value.

In some embodiments, processing logic can determine that the counter value does not equal the comparison value based on the comparison. Processing logic can select a second write operation mode from the multiple operation modes. Processing logic can perform a write operation to write the data at the memory component in accordance with the second write operation mode.

In some embodiment, responsive to performing the write operation to write the data at the memory component in accordance with the second write operation mode, processing logic can increment the counter to a new counter value. The new counter value is used to select the next write operation mode from the multiple write operation modes for a subsequent request to write data to the memory component. Operations of FIG. 3 are further described with respect to FIG. 6.

Figure 4:
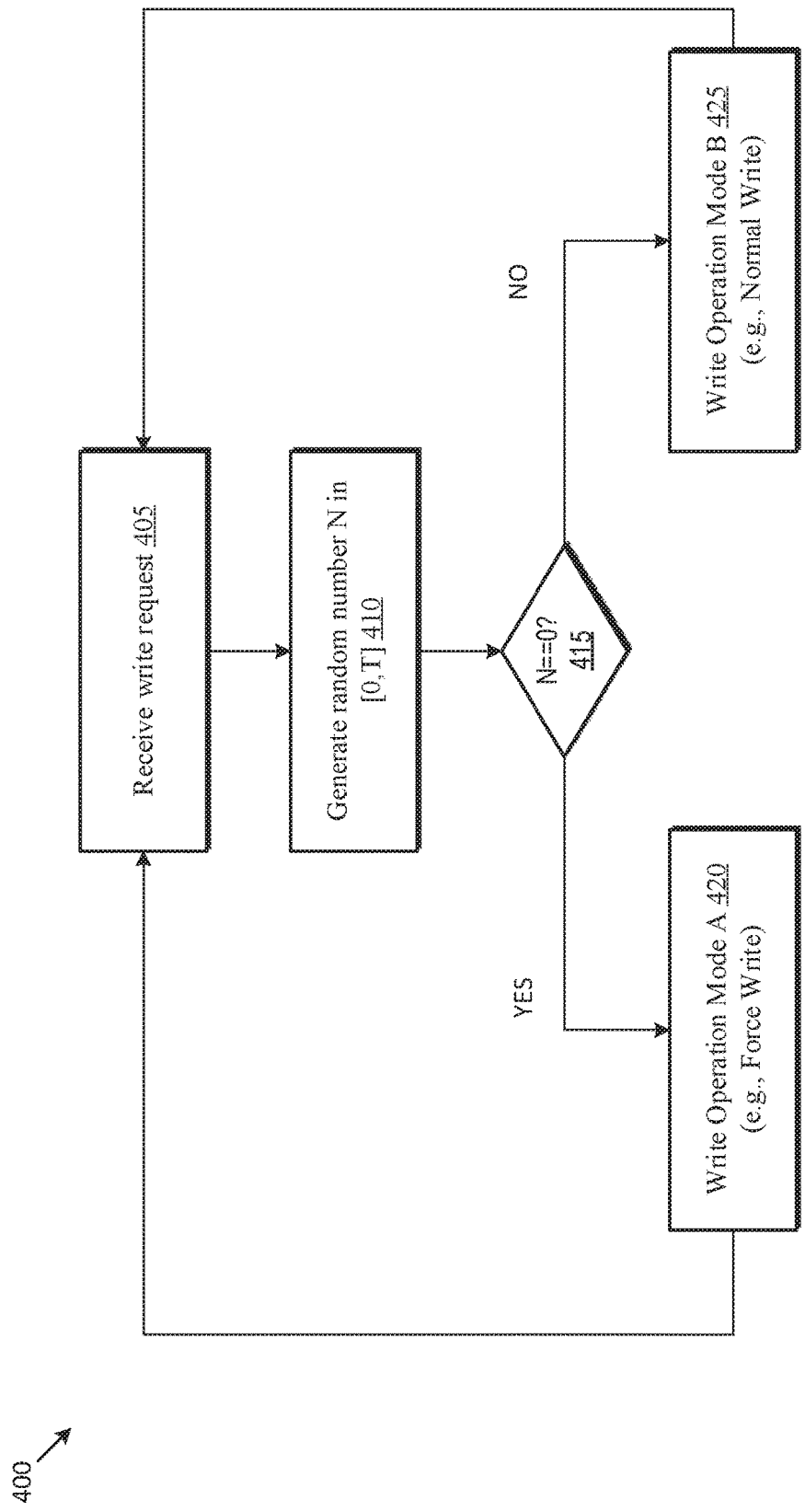
FIG. 4 is a flow diagram of an example method of selecting a write operation mode from multiple write operation modes, in accordance with some embodiments of the disclosure.

FIG. 4 is a flow diagram of an example method 400 of selecting a write operation mode from multiple write operation modes, in accordance with some embodiments of the disclosure. It can be noted that method 400 can be applied at a data unit level (e.g., executed for a write to each data unit), or extend to apply to larger than the data unit level (e.g., data block, plane, die, drive, etc.)

At operation 405, processing logic receives a write request. In embodiments, the write request is a request to write data at the memory component. For example, the host system can submit a write request to memory sub-system to write data to one or more memory components of memory sub-system.

At operation 410, processing logic generates a random value N that is within the range of values (0, T) (also referred to as "set of values" herein). In some embodiments, processing logic can cause a generation of the random value that is with a first range of values. The first range of values correspond to a frequency at which the first write operation mode is to be performed.

"T" can also be referred to as a period. In some embodiments, selecting a particular period, T, for the range of values allows for a particular write mode operation to be selected, and performed, at or near a particular frequency. For example, if T is 100, a random value generator has a 1/100 probability of selecting any particular value within the range of values (0,100). Although there is not a guarantee that every $100^{th}$ value produced by the random value generator will be a particular value, the random value generator will generate any particular number roughly 1 out of every 100 numbers generated on average. The frequency that a particular number will be selected can be roughly the frequency, 1/T (e.g., 1/100). In some embodiments, the period, T, can be selected such that a particular write operation mode is performed at or around a predictable frequency.

In some embodiments, the period, T, can change over the life of a memory component. For example, a new memory sub-system can be reliably operated such that a force write operation is performed for every 1000 write operations. Over time, the memory components of the memory sub-system can be more susceptible to disturb effects. After X number of write operations, it can be advantageous to perform a force write operation more frequently, such as once every 500 write operations, for example. After X number of write operations, the period, T, can be adjusted to 500 so that the frequency of the force write operation is roughly once for every 500 write operations.

In some embodiments, in determining whether to change the period T, processing logic can determine whether a state of a memory component satisfies a memory state condition. The memory state condition can be a threshold number of write operations that have been performed on the memory component. Responsive to determining that the state of the memory component satisfies the memory state condition, processing logic can select a range of values from multiple ranges of values by identifying a particular period, T, from group of T values. For example, the memory state condition can be satisfied when the number of write operations that have been performed on the memory component is equal to or exceeds a threshold number of write operations.

For example, a counter can be implemented for a particular memory sub-system, a particular memory component, or for a particular data block of a memory component. The counter can count the number of write operations, erase operations (e.g., for NAND), or both for the memory sub-system, memory component, or data block of a memory component. Once the counter reaches a threshold value, the current state of the memory sub-system, memory component, or data block satisfies the memory state condition and a new period value, T, can be selected from the group of period values. The new period value can correspond to the particular state of the memory component (e.g., the force write is to be performed more frequently and the new T is smaller than the old T). The above process can be repeated, for example, when the counter reaches a next threshold.

Figure 5:
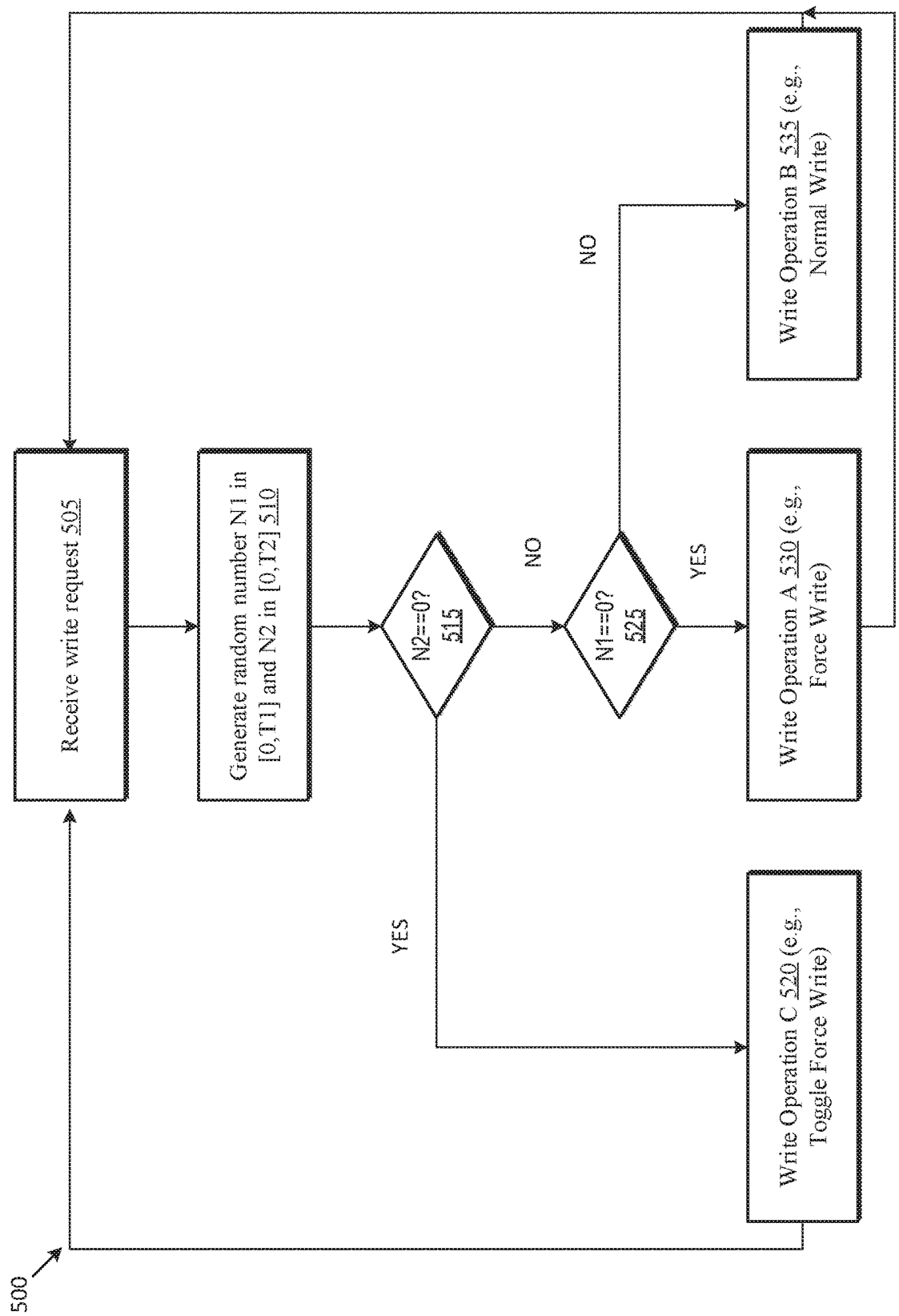
FIG. 5 is a flow diagram of an example method of selecting a write operation mode from multiple write operation modes, in accordance with some embodiments of the disclosure.
Figure 6:
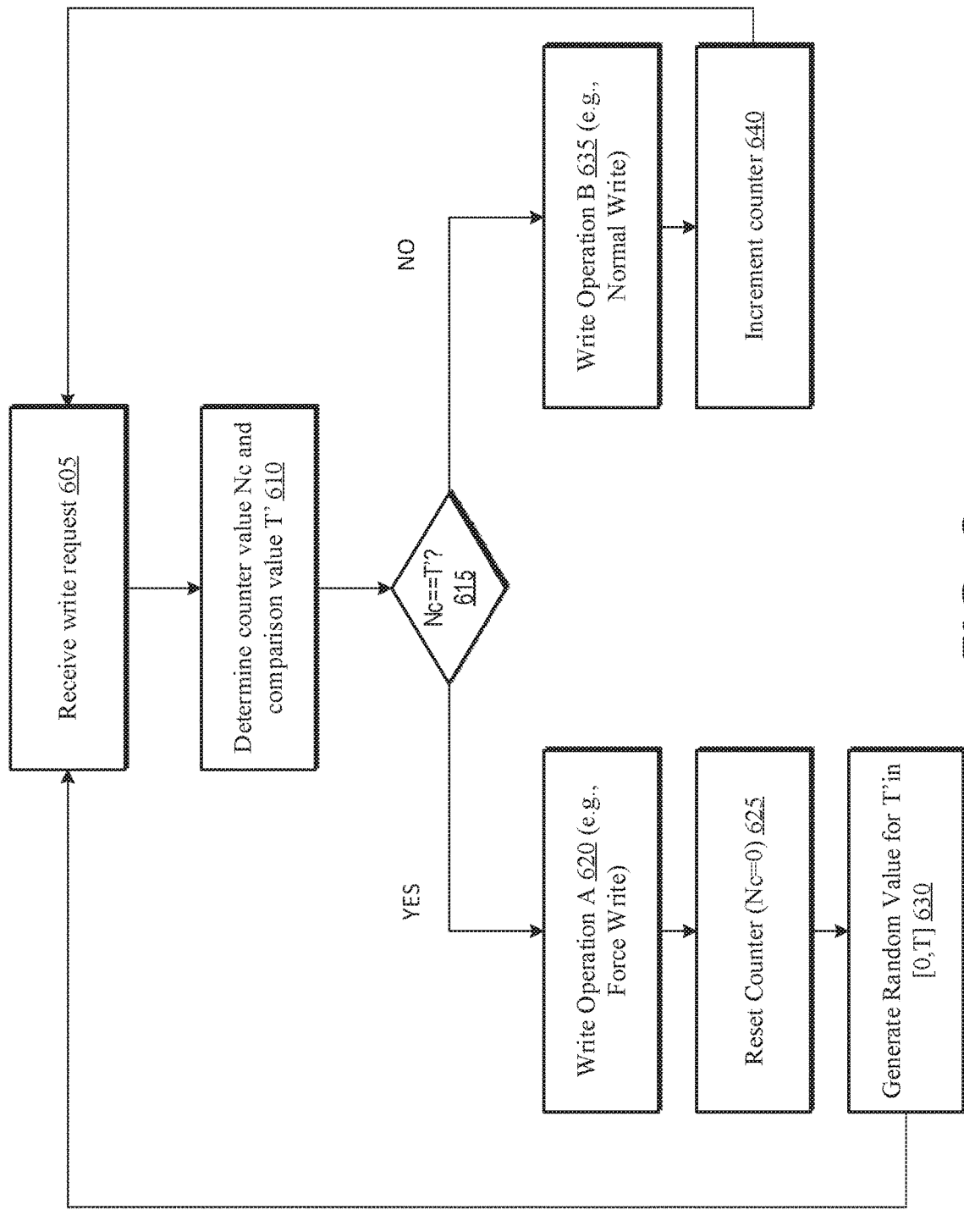
FIG. 6 is a flow diagram of an example method of selecting a write operation mode from multiple write operation modes, in accordance with some embodiments of the disclosure.

It can be noted that determining whether to change the period T, as described herein can also apply to other methods, such as method 500 and 600 described with respect to FIG. 5 and FIG. 6.

At operation 415, processing logic determines whether the random value that is generated to be within a first range of values satisfies a first threshold associated with a first range of values. In some embodiments, processing logic can compare the random value that is generated to be within the first range of values to a comparison value within the first range of values. For example, processing logic can compare the random number N to the comparison value "0," which is within range of values (0, T). For instance, if the period, T, is 100 the range of values is (0,100). The comparison value can be set at any value within the range of values (0,100).

In embodiments, responsive to determining that the random value, N, equals the comparison value, "0," processing logic can determine that the random value satisfies the first threshold. Processing logic can proceed to operation 420. In embodiments, responsive to determining that the random value does not equal the comparison value, processing logic can determine that the random value does not satisfy the first threshold. Processing logic can proceed to operation 425.

At operation 420, responsive to determining that the random value does satisfy the first threshold, processing logic selects the first write operation mode (e.g., write operation mode A) and perform the write operation to write the data at the memory component in accordance with the first write operation mode. For example, processing logic can select the force write operation mode and perform the force write operation to write the data to the memory component.

In the above example, the period, T, is 100. The probability that the random number, N, equals the comparison value is 1/100. The force write operation will approximately occur once every 100 normal writes on average. The frequency of the force write is approximately 1/100 write operations.

At operation 425, responsive to determining that the random value does not satisfy the first threshold associated with the first range of values, processing logic selects a second write operation mode from the multiple write operation modes, and performs a write operation to write the data at the memory component in accordance with the second write operation mode. In some embodiments, the second write operation mode is a normal write operation mode that performs a normal write operation that writes the data to the memory component. In the above example, the frequency of the normal write operation is roughly 99/100 write operations.

FIG. 5 is a flow diagram of an example method 500 of selecting a write operation mode from multiple write operation modes, in accordance with some embodiments of the disclosure. In embodiments, the number of write operation modes can be greater than two write operation modes. As illustrated, method 500 shows the selection of three write operation modes. It can be noted that aspects described herein, as in particular with respect to method 500, can be implemented to include any number of possible write operation modes. It can be noted that method 500 can be applied at a data unit level (e.g., executed for a write to each data unit), or extended to apply to larger than the data unit level (e.g., data block, plane, die, etc.)

At operation 505, processing logic receives a write request. In embodiments, the write request is a request to write data at the memory component. For example, the host system can submit a write request to memory sub-system to write data to one or more memory components of memory sub-system.

At operation 510, processing logic causes a generation of a first random value N1 that is within the first range of values (0, T1). Processing logic can cause a generation of a second random value N2 that is within the second range of values (0, T2). In some embodiments, the first range of values and the second range of values are different ranges of values. In some embodiments, the first range of values correspond to a first frequency at which the first write operation mode is to be performed. The second range of values correspond to a second frequency at which the third write operation mode is to be performed. The first frequency is less than the second frequency.

For example, the range of values (0, T2) is larger than the range of values (0, T1). The period, T1 can equal 100 so that the force write operation is performed with an approximate frequency of 1/100 write operations. The period, T2 can equal 1000 so that the toggle force write operation is performed with an approximate frequency of 1/1000 write operations.

At operation 515, processing logic determines whether the second random value that is generated to be within the second range of values satisfies a second threshold associated with the second range of values. In some embodiments, processing logic can compare the second random value that is generated to be within the second range of values to a comparison value within the second range of values. For example, processing logic can compare the random number N2 to the comparison value "0," which is within the second range of values (0, T2). For instance, if the period, T2, is 1000 the range of values is (0, 1000). The comparison value can be set at any value within the range of values (0, 1000).

In embodiments, responsive to determining that the second random value, N2, equals the comparison value, "0," processing logic can determine that the random value satisfies the second threshold associated with the second range of values. Processing logic can proceed to operation 520. In embodiments, responsive to determining that the second random value does not equal the comparison value, processing logic can determine that the second random value does not satisfy the second threshold. Processing logic can proceed to operation 525.

At operation 520, responsive to determining that the second random value does satisfy the second threshold, processing logic selects the third write operation mode (e.g., write operation mode C) and performs the write operation to write the data at the memory component in accordance with the third write operation mode. For example, processing logic can select the toggle force write operation mode and perform the toggle force write operation to write the data to the memory component.

In the above example, the period, T2, is 1000. The probability that the random number, N2, equals the comparison value is 1/1000. The toggle force write operation will approximately occur once every 1000 write operations on average. The frequency of the toggle force write is approximately 1/1000 write operations.

At operation 525, responsive to determining that the second random value does not satisfy the second threshold associated with the second range of values, processing logic determines whether the first random value satisfies a first threshold associated with the first range of values. In can be noted that operation 525 is similar to operation 415 described with respect to FIG. 4.

In some embodiments, processing logic can compare the first random value that is generated to be within the first range of values to a comparison value within the first range of values. For example, processing logic can compare the random number N1 that is generated to be within (0, T1) to the comparison value "0," which is also within the first range of values (0, T1). For instance, if the period, T1, is 100 the range of values is (0, 100). The comparison value can be set at any value within the range of values (0, 100).

In the above example, the period, T1, is 100. The probability that the random number, N1, equals the comparison value is 1/100. The force write operation will approximately occur once every 100 write operations on average. The frequency of the toggle force write is approximately 1/100 write operations.

As illustrated, there are two decision making operations (e.g., operation 515 and operation 525) used to make a selection of a write operation mode from three different write operation modes. In some embodiments, the decision making operations are ordered such that the operation that corresponds with the least frequent write operation mode (e.g., largest T) is determined first, and the operation that corresponds to the second least frequent write operation (e.g., second largest T) is determined second, and so forth. The above can be expanded for more than two decision making operations. It can be further noted that the multiple decision making operations can be applied in similar manner to method 600 of FIG. 6.

In embodiments, responsive to determining that the first random value, N1, equals the comparison value, "0," processing logic can determine that the first random value satisfies the first threshold associated with the first range of values. Processing logic can proceed to operation 530. In embodiments, responsive to determining that the first random value does not equal the comparison value, processing logic can determine that the first random value does not satisfy the first threshold. Processing logic can proceed to operation 535.

At operation 530, responsive to determining that the first random value does satisfy the first threshold, processing logic selects the first write operation mode (e.g., write operation mode A) and performs the write operation to write the data at the memory component in accordance with the first write operation mode. For example, processing logic can select the force write operation mode and perform the force write operation to write the data to the memory component.

At operation 535, responsive to determining that the first random value does not satisfy the first threshold associated with the first range of values, processing logic selects a second write operation mode from the multiple write operation modes, and performs a write operation to write the data at the memory component in accordance with the second write operation mode. In some embodiments, the second write operation mode is a normal write operation mode that performs a normal write operation that writes the data to the memory component. In the above example, the frequency of the normal write operation is roughly 99/100 write operations.

FIG. 6 is a flow diagram of an example method 600 of selecting a write operation mode from multiple write operation modes, in accordance with some embodiments of the disclosure. It can be noted that method 600 can be applied at a data unit level (e.g., executed for a write to each data unit), or extend to apply to larger than a data unit level (e.g., data block, plane, die, etc.). As described with respect to FIG. 6, the method 600 is applied at the data block level for purposes of illustration rather than limitation.

At operation 605, processing logic receives a write request. In embodiments, the write request is a request to write data at the memory component. For example, the host system can submit a write request to memory sub-system to write data to one or more memory components of memory sub-system.

At operation 610, processing logic determines a counter value, Nc, generated by a counter and a comparison value T'. In some embodiments, the counter is a data block level counter. The data block can include multiple data units. The counter can increment each time a data unit of the data block is written to. In another embodiments, the counter can increment each time the data block is written to, irrespective of the number of data units of the data block are written to.

In some embodiments, processing logic can also determine the comparison value, T'. T' is related to the period T. In some embodiments, T' is a random value that is generated by the value generator. T' can be generated to be within a range of values (0, T). After T' is generated, T' can be stored until a new T' is generated (see operation 630). In some embodiments, the counter value can be initialized as Nc=0 and T' can be initialized to T, T'=T.

At operation 615, processing logic can determine whether the counter value satisfies a threshold associated with a range of values. In some embodiments, processing logic can compare the counter value, Nc, to a comparison value, T' (e.g., threshold). For example, processing logic can compare the counter value, Nc, to the comparison value, T'=90, which is within the range of values (0, T). For instance, if the period, T, is 100 the range of values is (0, 100). The comparison value can be a random value that is generated to be within the range of values (0, 100).

In embodiments, responsive to determining that the counter value, Nc, equals the comparison value, T', processing logic can determine that the counter value satisfies the threshold associated with the range of values. Processing logic can proceed to operation 620.

In embodiments, responsive to determining that the counter value does not equal the comparison value, T', processing logic can determine that the counter value does not satisfy the threshold. Processing logic can proceed to operation 635.

At operation 620, responsive to determining that the counter value does satisfy the threshold, processing logic selects the first write operation mode (e.g., write operation mode A) and performs the write operation to write the data at the memory component in accordance with the first write operation mode. For example, processing logic can select the force write operation mode and perform the force write operation to write the data to the memory component.

In the above example, the period, T, is 100. The frequency of the force write is approximately 1/100 write operations.

At operation 625, processing logic resets the counter. For example, processing logic can send a reset command to the counter so that the counter resets to zero, Nc=0.

At operation 630, responsive to performing the write operation to write the data at the memory component in accordance with the first write operation mode, processing logic generates another random value that is within the range of values. For example, processing logic can generate a new T' that is within the range of values (0, T). The new T' can be stored and used for the next write operation at the data block.

At operation 635, responsive to determining that the counter value does not satisfy the threshold associated with the first range of values, processing logic selects a second write operation mode from the multiple write operation modes, and performs a write operation to write the data at the memory component in accordance with the second write operation mode. In some embodiments, the second write operation mode is a normal write operation mode that performs a normal write operation that writes the data to the memory component. In the above example, the frequency of the normal write operation is roughly 99/100 write operations.

At operation 640, responsive to performing the write operation to write the data at the memory component in accordance with the second write operation mode, processing logic increments the counter to a new counter value (e.g., from 1 to 2). The new counter value is used to select the next write operation mode from the multiple write operation modes for a subsequent request to write data to the memory component.

Figure 7:
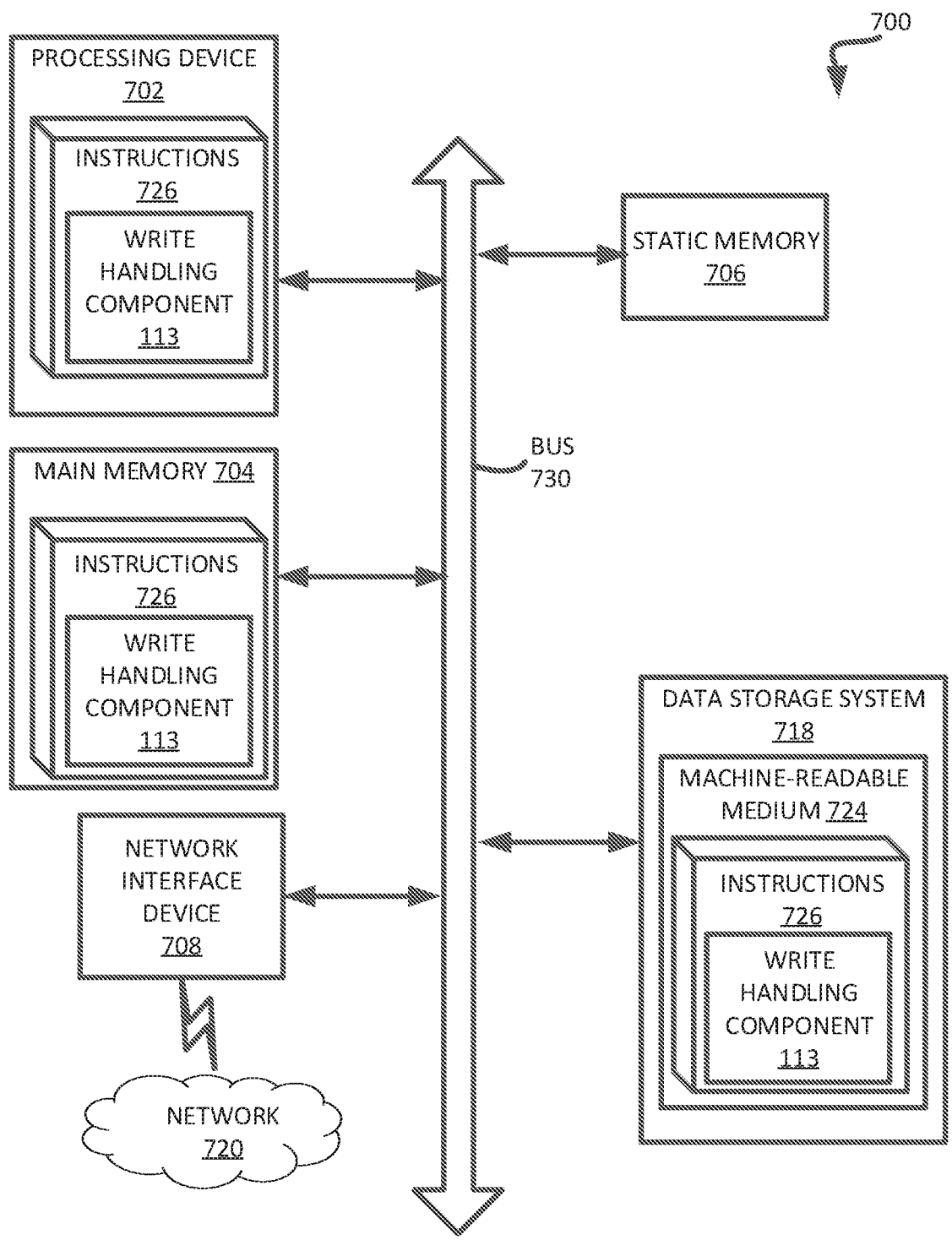
FIG. 7 illustrates an example machine of a computer system within which a set of instructions, for causing the machine to perform any one or more of the operations discussed herein, can be executed.

FIG. 7 illustrates an example machine of a computer system 700 within which a set of instructions, for causing the machine to perform any one or more of the methodologies discussed herein, can be executed. In some embodiments, the computer system 700 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the write handling component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage system 718, which communicate with each other via a bus 730.

Processing device 702 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 702 can also be one or more special-purpose processing devices such as an application specific integrated circuit (ASIC), a field programmable gate array (FPGA), a digital signal processor (DSP), network processor, or the like. The processing device 702 is configured to execute instructions 726 for performing the operations and steps discussed herein. The computer system 700 can further include a network interface device 708 to communicate over the network 720.

The data storage system 718 can include a machine-readable storage medium 724 (also known as a non-transitory computer-readable storage medium) on which is stored one or more sets of instructions 726 or software embodying any one or more of the methodologies or functions described herein. The instructions 726 can also reside, completely or at least partially, within the main memory 704 and/or within the processing device 702 during execution thereof by the computer system 700, the main memory 704 and the processing device 702 also constituting machine-readable storage media. The machine-readable storage medium 724, data storage system 718, and/or main memory 704 can correspond to the memory sub-system 110 of FIG. 1.

In one embodiment, the instructions 726 include instructions to implement functionality corresponding to the write handling component 113 of FIG. 1. While the machine-readable storage medium 724 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the disclosure. The term "machine-readable storage medium" shall accordingly be taken to include, but not be limited to, solid-state memories, optical media, and magnetic media.

Some portions of the preceding detailed descriptions have been presented in terms of operations and symbolic representations of operations on data bits within a computer memory. These algorithmic descriptions and representations are the ways used by those skilled in the data processing arts to most effectively convey the substance of their work to others skilled in the art. An algorithm or operation is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms, operations, and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the disclosure is not described with reference to any particular programming language. It will be appreciated that a variety of programming languages can be used to implement the teachings of the disclosure as described herein.

The disclosure can be provided as a computer program product, or software, that can include a machine-readable medium having stored thereon instructions, which can be used to program a computer system (or other electronic devices) to perform a process according to the disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims may generally be construed to mean "one or more" unless specified otherwise or clear from context to be directed to a singular form. Moreover, use of the term "an implementation" or "one implementation" or "an embodiment" or "one embodiment" or the like throughout is not intended to mean the same implementation or implementation unless described as such. One or more implementations or embodiments described herein may be combined in a particular implementation or embodiment. The terms "first," "second," "third," "fourth," etc. as used herein are meant as labels to distinguish among different elements and may not necessarily have an ordinal meaning according to their numerical designation.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
a memory component; and
a processing device, operatively coupled with the memory component, to perform operations comprising:
  receiving a request to write data at the memory component;
  responsive to receiving the request to write the data at the memory component, determining a first random value;
  determining whether the first random value satisfies a first threshold criterion;
  responsive to determining that the first random value does not satisfy the first threshold criterion,
    determining a second random value, and
    determining whether the second random value satisfies a second threshold criterion; and
  responsive to determining that the first random value does not satisfy the first threshold criterion and the second random value does satisfy the second threshold criterion,
    selecting a first write operation mode from a plurality of write operations modes, and
    performing a write operation to write the data at the memory component in accordance with the first write operation mode.

2. The system of claim 1, wherein determining the first random value, comprises:

causing a generation of the first random value that is with a first range of values, wherein the first range of values correspond to a frequency at which at least one of the plurality of write operation modes is to be performed.

3. The system of claim 2, wherein the processing device to perform the operations further comprising:
determining whether a state of the memory component satisfies a memory state condition; and
responsive to determining that the state of the memory component satisfies the memory state condition, selecting the first range of values from a plurality of ranges of values.

4. The system of claim 1, wherein determining whether the first random value satisfies the first threshold criterion, comprises:
determining whether the first random value that is generated to be within a first range of values satisfies the first threshold criterion associated with the first range of values.

5. The system of claim 4, the processing device to perform the operations further comprising:
responsive to determining that the first random value does satisfy the first threshold criterion associated with the first range of values, selecting a second write operation mode from the plurality of write operation modes, and
performing a write operation to write the data at the memory component in accordance with the second write operation mode.

6. The system of claim 5, wherein determining the second random value comprises:
determining the second random value that is generated to be within a second range of values;
wherein determining whether the second random value satisfies the second threshold criterion comprises determining whether the second random value that is generated to be within the second range of values satisfies the second threshold criterion associated with the second range of values;
responsive to determining that the second random value does not satisfy the second threshold criterion associated with the second range of values, selecting a third write operation mode from the plurality of write operation modes; and
performing a write operation to write the data at the memory component in accordance with the third write operation mode.

7. The system of claim 6, wherein the first range of values correspond to a first frequency at which the second write operation mode is to be performed, wherein the second range of values correspond to a second frequency at which the first write operation mode is to be performed.

8. The system of claim 4, wherein determining whether the first random value that is generated to be within the first range of values satisfies the first threshold criterion associated with the first range of values, comprises:
comparing the first random value that is generated to be within the first range of values to a comparison value within the first range of values;
responsive to determining that the first random value equals the comparison value in view of the comparison, determining that the first random value satisfies the first threshold criterion; and
responsive to determining that the first random value does not equal the comparison value in view of the comparison, determining that the first random value does not satisfy the first threshold criterion.

9. The system of claim 1, wherein the plurality of write operation modes comprise the first write operation mode, a second write operation mode and a third write mode, wherein a write operation of the first write operation mode writes an entire data unit of the memory component, and wherein a write operation of the third write operation mode writes to a portion of a data unit of the memory component.

10. A system comprising:
a memory component; and
a processing device, operatively coupled with the memory component, to perform operations comprising:
receiving a request to write data at the memory component;
responsive to receiving the request to write the data at the memory component, determining a counter value of a counter;
selecting a first write operation mode from a plurality of write operation modes based on a comparison of the counter value to a random value that is generated to be within a range of values, wherein the first write operation mode is selected less frequently than a second write operation mode of the plurality of write operation modes based on the comparison of the counter value to the random value that is generated to be within the range of values; and
performing a write operation to write the data at the memory component in accordance with the first write operation mode.

11. The system of claim 10, wherein selecting the first write operation mode from the plurality of write operation modes, comprises:
comparing the counter value to the random value; and
determining that the counter value is equal to the random value based on the comparison, wherein to select the first write operation mode from the plurality of write operation modes is responsive to determining that the counter value equals the random value.

12. The system of claim 11, wherein the processing device to perform the operations further comprising:
responsive to performing the write operation to write the data at the memory component in accordance with the first write operation mode, generating the random value that is within the range of values.

13. The system of claim 11, wherein the processing device to perform the operations further comprising:
determining that the counter value does not equal the random value based on the comparison;
responsive to determining that the counter value does not equal the random value, selecting the second write operation mode from the plurality of write operation modes; and
performing a write operation to write the data at the memory component in accordance with the second write operation mode.

14. The system of claim 13, wherein the processing device to perform the operation further comprising:
responsive to performing the write operation to write the data at the memory component in accordance with the second write operation mode, increment the counter to a new counter value, wherein the new counter value is used to select a next write operation mode from the plurality of write operation modes for a subsequent request to write data to the memory component.

15. A method comprising:
receiving a request to write data at a memory component;
responsive to receiving the request to write the data at the memory component, determining a first random value;

determining whether the first random value satisfies a first threshold criterion;

responsive to determining that the first random value does not satisfy the first threshold criterion,
  determining a second random value, and
  determining whether the second random value satisfies a second threshold criterion; and responsive to determining that the first random value does not satisfy the first threshold criterion and the second random value does satisfy the second threshold criterion,
  selecting a first write operation mode from a plurality of write operations modes, and
  performing, by a processing device, a write operation to write the data at the memory component in accordance with the first write operation mode.

16. The method of claim 15, wherein determining the first random value, comprises:

causing a generation of the first random value that is with a first range of values, wherein the first range of values correspond to a frequency at which at least one of the plurality of write operation modes is to be performed.

17. The method of claim 15, further comprising:

determining whether the first random value that is generated to be within a first range of values satisfies the first threshold criterion associated with the first range of values.

18. The method of claim 17, further comprising:

responsive to determining that the first random value does satisfy the first threshold criterion associated with the first range of values, selecting a second write operation mode from the plurality of write operation modes, and performing a write operation to write the data at the memory component in accordance with the second write operation mode.

* * * * *